July 29, 1969   E. K. CLARDY ET AL   3,457,774
FLOW PROGRAMMED CHROMATOGRAPHY
Filed March 10, 1967

INVENTORS
E. K. CLARDY
C. J. RAIBLE
BY Young & Quigg
ATTORNEYS

United States Patent Office 3,457,774
Patented July 29, 1969

3,457,774
FLOW PROGRAMMED CHROMATOGRAPHY
Edwin K. Clardy and Clarence J. Raible, Bartlesville, Okla., assignors to Phillips Petroleum Company, a corporation of Delaware
Filed Mar. 10, 1967, Ser. No. 622,343
Int. Cl. G01n 31/08
U.S. Cl. 73—23.1                                  6 Claims

ABSTRACT OF THE DISCLOSURE

Programmed flow of a first carrier gas stream through a chromatographic column is carried out while maintaining a constant flow rate of carrier gas to the chromatographic detector, by passing a second carrier gas stream into the first carrier gas stream leaving the chromatographic column to form a third carrier gas stream which is passed to the detector. The third carrier gas stream is maintained at a constant flow rate by decreasing the flow rate of the second carrier gas stream simultaneously with each increase of the flow rate of the first carrier gas stream.

---

Figure 1:
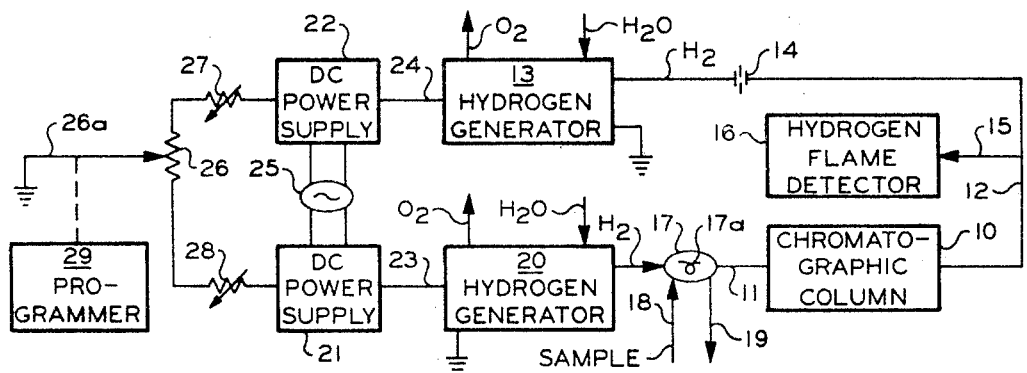

This invention relates to chromatography. In another aspect, this invention relates to a novel apparatus for analyzing fluid samples.

In elution chromatography, a sample of the material to be analyzed is introduced into a column which contains a selective sorbent. A carrier gas is directed into the column so as to force the constituents of the sample through the column. The sorbent attempts to hold the constituents in the column whereas the carrier tends to push the constituents through the column. This results in the several constituents of the fluid sample traveling through the column at different rates of speed, depending upon their affinities for the packing material. The individual constituents of the fluid sample thus appear in the effluent from the column in sequence. These constituents are normally detected by means such as mass spectrographs, thermal conductivity analyzers, or gas ionization detectors. The presence of these components is normally recorded as various shaped peaks on a paper roll, etc. This record is called a chromatogram.

If the elution process is carried out under isothermal and isobaric conditions, various detection problems occur. For example, at lower temperatures, the peaks representing the earlier or less volatile components will be sharp and separate; however, the peaks representing the later or higher boiling components will be broad and flat and their elution times very long. If, on the other hand, higher temperatures are used, the peaks representing the late components with the higher retention times will be brought closer to the earlier peaks, but the resolution and spacing of the peaks will be poor in the earlier region of the chromatogram. Thus, it has been found that shorter analysis cycles can be had for wide boiling samples by utilizing a temperature programmed analysis cycle, i.e., increase the chromatographic column temperature after the earlier peaks are eluted, and thereby speed up the elution of the later peaks. This temperature increase can be carried out in a stepwise manner if desired to elute components or groups of components of varying retention times. However, the disadvantages that result from temperature programmed chromatography are undesirable shifts in the base line of the chromatogram as the temperature of the effluent from the column is increased; and longer cooling periods between analysis cycles, i.e., the chromatographic column must be cooled from the highest temperature of the preceding cycle to the lowest temperature of the next analysis cycle.

Recently it has been found that the analysis time can be shortened for wide boiling range samples by programming the carrier gas flow rate through the chromatographic column, even if it is maintained at a single temperature. Thus, an increase in the flow rate of the carrier gas after the early peaks have been eluted will elute the later peaks at a much faster rate. Problems have occurred here, however, because these carrier gas flow rate variations will result in the undesired shift in the chromatogram base line. This results in difficulties in the calibration of the recorded peaks, and in some instances it tends to hide the smaller peaks.

Therefore, the object of this invention is to provide a novel apparatus for carrying out chromatographic analysis of the fluid sample under programmed flow conditions.

According to one embodiment of this invention, a first carrier gas stream is passed through a chromatographic separation zone to elute sample components therefrom, and a second carrier gas stream is passed to and combined with said first carrier gas stream leaving said chromatographic separation zone to form a third carrier gas stream. This third carrier gas stream is then passed to a detection zone. The flow rate of the said first and second carrier gas streams is programmed so that as the flow rate of said first carrier gas stream is increased to elute the slower components through the chromatographic zone, the flow rate of the second carrier gas stream is simultaneously decreased so that the flow rate of the third carrier gas stream remains constant at all times. This results in a constant rate of flow of carrier gas to the detection zone at all times.

According to another embodiment of this invention, a chromatographic analysis apparatus is provided comprising a chromatographic separation column having first and second conduits communicating with its ends respectively. The first conduit has a sample valve for introducing measured amounts of a sample fluid operatively positioned therein. This first conduit is also connected to a first means for supplying carrier gas thereto at a programmed flow rate. The second conduit communicates with a detector such as a flame ionization detector or a thermistor detector. A third conduit communicates with the said second conduit at a point between the chromatographic separation column and the detector. A second means for supplying carrier gas at a programmed flow rate is connected to the said third conduit. In a preferred embodiment, the detector is a hydrogen flame ionization detector, and the first and second means for supplying carrier gas at a programmed flow rate are hydrogen generators, each having means for supplying variable operating current thereto.

Figure 2:
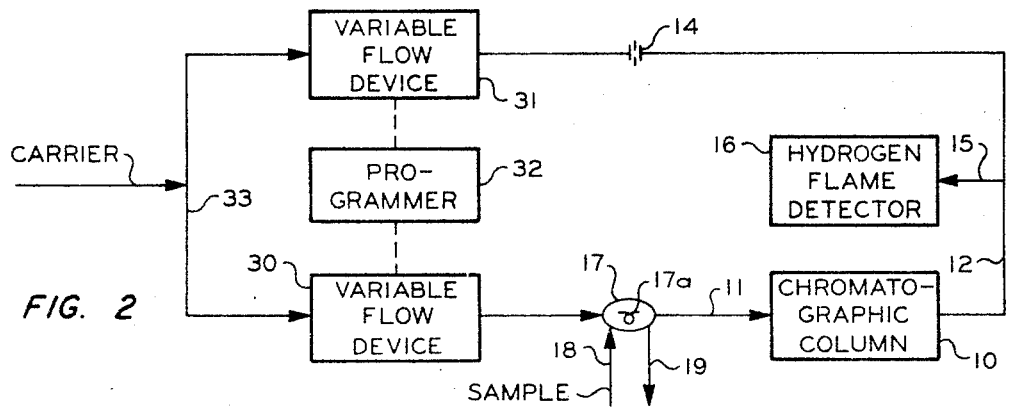
Figure 3:
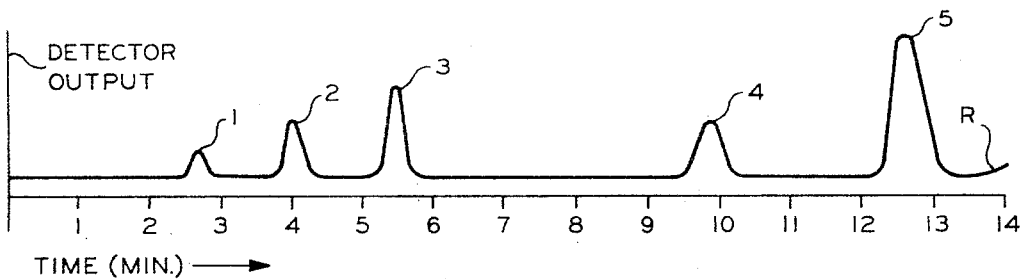
Figure 4:
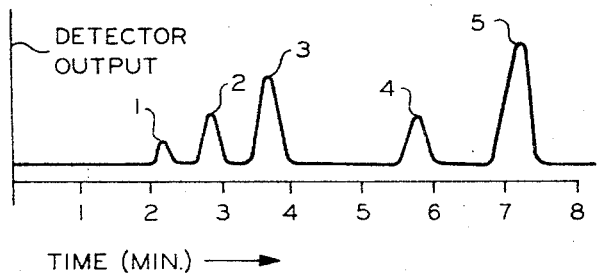

This invention can be more easily understood from a study of the drawing in which FIGURE 1 is a schematic illustration of one embodiment of this invention, and FIGURE 2 is a schematic illustration of another embodiment of this invention. FIGURE 3 is a chromatogram of a typical isothermal isobaric chromatographic analysis. FIGURE 4 is a chromatogram illustrating the process of this invention.

Now referring to the drawing and in particular to FIGURE 1, there is pictured a schematic illustration of a preferred embodiment of this invention. Chromatographic column 10 has conduit 11 communicating with its inlet and conduit 12 communicating with its outlet. Conduit 12 communicates between chromatographic column 10 and hydrogen generator 13, and has flow restrictor 14 positioned therein. Flow restrictor 14 can be an orifice type construction device, a dummy chromatographic column, or any other flow restriction device known in the art. The purpose of flow restrictor 14 is to provide a pressure drop of the hydrogen flowing therethrough substantially the same as the pressure drop of the hydrogen flowing through chromatographic column 10. Even though flow restrictor 14 is not necessary in all embodiments of this invention that can be constructed by one skilled in the art from a study of this disclosure, with the particular hydrogen generators and power supply units that are actually used herein, restrictor 14 will facilitate a better control of the hydrogen flowing to detector 16. Flame detector 16 is connected to conduit 12 by conduit 15 and is illustrated as a hydrogen flame ionization detector. However, detector 16 can be any type detector known in the art, such as a thermistor or ionization type.

Sample valve 17 is operatively positioned within conduit 11 and has sample introduction conduit 18 and sample exhaust conduit 19 communicating therewith. When sample valve 17 is in a first position, sample fluid will flow through conduit 18, sample loop 17a and out sample exhaust conduit 19. When sample valve 17 is placed in its second position, hydrogen carrier gas will flow through sample loop 17a and carry sample components therefrom to chromatographic column 10. During this time, the sample will flow in conduit 18 and out conduit 19. Sample valve 17 can be the sample valve disclosed in U.S. Patent 3,140,615.

As illustrated, the hydrogen outlet of hydrogen generator 20 is connected to conduit 11. Hydrogen generators 13 and 20 can be any hydrogen generator known in the art comprising an anode and a cathode disposed in an electrolyte solution such as strong alkali. Water is supplied to the electrolyte solution and DC current is supplied to the cathode. This causes the water to ionize. As a consequence, the ionic hydrogen collects at the cathode and the ionic oxygen collects at the anode. Molecular hydrogen is thereby formed and removed via conduit 11. Also, molecular oxygen is formed at the anode and removed by conduits illustrated in FIGURE 1. Hydrogen generators 13 and 20 can be the model 35 hydrogen generator manufactured by Hewlett-Packard Company of Dallas, Tex., with its normal rectification unit removed and a DC power supply unit as will be described below substituted therefor.

The operating current for hydrogen generators 20 and 13 is derived from DC power supply units 21 and 22 via leads 23 and 24 respectively. DC power supply units can be any suitable rectification unit such as the low voltage DC power supply—models 6385A to 6388A sold by Hewlett-Packard Incorporated, Berkeley Heights, Calif. AC power source 25 supplies AC power such as 60 cycle 115 volt to DC power supply units 21 and 22 as illustrated in FIGURE 1. These DC power supply units utilized are capable of remote programming either by external resistance or control voltage. Thus, the relative DC output to hydrogen generators 13 and 20 from DC power supply units 22 and 21, respectively, are controlled by potentiometer 26. Variable resistors 27 and 28 are used to balance the zero reading of potentiometer 26. The position of potentiometer arm 26a is controlled by programmer 29.

As illustrated, when potentiometer arm 26a is centered to provide a zero output, the DC current supplied to hydrogen generators 20 and 13 via leads 23 and 24, respectively, will be equal. Thus, the hydrogen flow from restrictor 14 and chromatographic column 10 will also be equal. As potentiometer arm 26a is moved downward, the DC current supplied to hydrogen generator 20 via lead 23 becomes greater than the DC current supplied to hydrogen generator 13 via lead 24. This in turn results in a greater hydrogen flow from chromatographic column 10 than from restrictor 14, but the total flow through conduit 15 will remain the same. Therefore, it is readily seen that the carrier gas flow rate for a wide boiling range sample can be programmed so that a uniform increased flow or a stepwise increased flow can be passed through chromatographic column 10 sequentially as latter components are eluted therefrom to provide for the elution of the higher boiling components still sorbed by the column at a much faster rate than they could be eluted when utilizing a constant carrier gas flow rate. Thus, this uniform or stepwise increase in carrier gas flow rate through chromatographic column 10 will be simultaneously offset by a uniform or stepwise decrease in the carrier gas flow rate flowing through restrictor 14 so that the flow rate of the carrier gas flowing through conduit 15 will remain substantially constant at all times during the elution cycle. In this manner, a programmed flow of carrier gas through chromatographic column 10 can be accomplished and thereby speed the analysis cycle of the wide boiling range samples while the column is maintained at substantially a constant temperature. However, if desired, it is to be understood that a programmed heating cycle of chromatographic column 10 can be carried out simultaneously with the programmed carried gas flow rate therethrough by means not illustrated in FIGURE 1.

FIGURE 2 is a schematic illustration of another embodiment of this invention wherein a programmed flow of carrier gas to a chromatographic column can be carried out with a constant carrier gas flow rate subsequently passing to a sample detector. As illustrated in FIGURE 2, chromatographic column 10, sample valve 17, detector 16, flow restrictor 14, and connecting conduits 11, 12 and 15 are the same as in FIGURE 1 but variable flow devices 30 and 31 are substituted for hydrogen generators 20 and 13 and DC power supply units 21 and 22, respectively. Variable flow devices 30 and 31 can be any type electrically or pneumatically controlled variable flow valving mechanism known in the art. The operating positions of variable flow devices 30 and 31 are controlled by programmer 32. An inert carrier gas such as hydrogen or helium, etc., is supplied via conduit 33. Variable flow devices 30 and 31 are programmed to sequentially operate and supply constant carrier gas flow to conduit 15 in a similar manner as the device as illustrated in FIGURE 1. Thus, as the flow through variable flow device 30 is increased, the flow through variable flow device 31 is simultaneously decreased, etc. Therefore, the operation of the apparatus as illustrated in FIGURE 2 is substantially the same as the operation of the apparatus as illustrated in FIGURE 1.

This invention can be better understood from a study of the following examples:

EXAMPLE I

FIGURE 3 is a chromatogram of a typical analysis of a $C_3$–$C_5$ hydrocarbon stream. The components are separated by a chromatographic column 20 feet long and ⅛ inch in diameter filled with any conventional granular sorbent such as Silicon, Dow Corning 50 sorbent material. The column is maintained at 25° C. An inert carrier gas such as helium is passed through the column at a constant rate of 22 cc./min. and a sample slug was placed therein and thereby carried to the column. The components are then eluted from the column and detected with any suitable detector such as a thermistor detector in the following sequence.

| Component: | Elution time |
| --- | --- |
| (1) Propane | 3 min. |
| (2) Isobutane | 4 min. 15 sec. |
| (3) n-Butane | 5 min. 40 sec. |
| (4) Isopentane | 10 min. 20 sec. |
| (5) n-Pentane | 13 min. 20 sec. |

The rise in the base line indicated as R on FIGURE 3 is an indication of the baseline shift when the flow rate through the column is increased to 44 cc./min.

EXAMPLE II

FIGURE 4 is a chromatogram of the analysis of the same components as in FIGURE 3 but carried out with the apparatus of FIGURE 2 wherein column 10 and detector 16 are the same as described in Example I. Again, column 10 is maintained at 25° C. A constant carrier gas flow rate of 150 cc./min. is supplied to detector 16 throughout the entire analysis. Initially, 22 cc./min. of carrier passes through column 10 and 128 cc./min. passes through restrictor 14. A measured slug of sample fluid was placed in the carrier gas to column 10 in a similar manner as described in Example I. One and one-half minutes after the sample is passed to column 10, the flow rate of the carrier gas through column 10 is increased to 44 cc./min. and the flow rate through restrictor 14 is decreased to 106 cc./min. Forty seconds later propane is eluted. Fifty seconds later the isobutane is eluted and the carrier gas flow rate through column 10 is increased to 66 cc./min. while the carrier gas flow rate through restrictor 14 is decreased to 84 cc./min. Forty-five seconds later the n-butane is eluted, and forty-five seconds after this the flow rate through column 10 is increased to 89 cc./min. while the flow rate through restrictor 10 is decreased to 61 cc./min. One and one-half minutes after this, the isopentane is eluted and the flow rate through column 10 is increased to 102 cc./min. while the flow rate through restrictor 14 is decreased to 48 cc./min. One minute and ten seconds later the normal pentane is eluted. It is noted that the base line throughout the seven minute and ten second analysis cycle remained constant.

A comparison of Examples I and II is given below:

| Component | Elution time, example I | Elution time, example II |
|---|---|---|
| Propane | 3 min | 2 min. 10 sec. |
| Isobutane | 4 min. 15 secg | 3 min. |
| n-Butane | 5 min. 40 sec | 3 min. 45 sec. |
| Isopentane | 10 min. 20 sec | 6 min. |
| n-Pentane | 13 min. 20 sec | 7 min 10 sec. |

Therefore, as illustrated in the above examples, the elution time for wide boiling samples can be substantially decreased under isothermal conditions with the application of this novel process without a corresponding shift in the baseline on the chromatogram.

While the invention has been described in conjunction with present preferred embodiments, it is evident that it is not limited thereto.

We claim:
1. Chromatographic apparatus comprising:
   (a) first carrier gas generator means;
   (b) second carrier gas generator means;
   (c) first power supply means connected to said first generator means to regulate the rate at which carrier gas is generated thereby;
   (d) second power supply means connected to said second generator means to regulate the rate at which carrier gas is generated thereby;
   (e) programmer means connected to said first and second power supply means so as to vary the outputs thereof, and thereby the rates at which carrier gas is generated by said first and second generating means, while maintaining the total outputs of said power supplies at a constant level;
   (f) chromatographic column means having an inlet and an outlet;
   (g) first conduit means having its first end communicating with said outlet;
   (h) second conduit means having its first end communicating with said inlet and its second end communicating with said second carrier gas generating means;
   (i) sample valve means operably positioned in said second conduit means in order to insert a measured amount of sample into said second conduit means at specified times;
   (j) third conduit means having its first end communicating with said first carrier gas generating means;
   (k) flow restriction means operably positioned in said third conduit means;
   (l) chromatographic detector means;
   (m) fourth conduit means having its first end communicating with the second end of said first conduit means and the second end of said third conduit means, the second end of said fourth conduit means being in communication with said chromatographic detector means.

2. The apparatus of claim 1 wherein said first and second carrier gas generating means comprise first and second electrolytic hydrogen generators.

3. The apparatus of claim 2 wherein said programmer means comprises an apparatus capable of making stepwise changes in the production rates of said first and second hydrogen generators.

4. The apparatus of claim 3 wherein said chromatographic detector means comprises a hydrogen flame ionization detector.

5. The apparatus of claim 1 further comprising means for varying an external input resistance of said first and second power supply means connected to said programmer means.

6. The apparatus of claim 5 wherein said means for varying comprises a first variable resistance having two terminals, the first of which is connected to the input of said first power supply means; a second variable resistance having two terminals, the first of which is connected to the input of said second power supply means; and a potentiometer having two fixed connectors and one movable connector, one of said fixed connectors being connected to the second terminal of said first variable resistance, one of said fixed connectors being connected to the second terminal of said second variable resistance, and said movable connector being connected to and movable by said programmer means.

References Cited

UNITED STATES PATENTS 3,250,057   5/1966   Clarke _____ 55—197 X

REUBEN FRIEDMAN, Primary Examiner

J. L. DE CESARE, Assistant Examiner

U.S. Cl. X.R.

55—197